March 29, 1932.  Y. BRANCART  1,851,803
PROCESS AND APPARATUS FOR ROLLING THICK PLATES OF GLASS
Filed Oct. 11, 1930
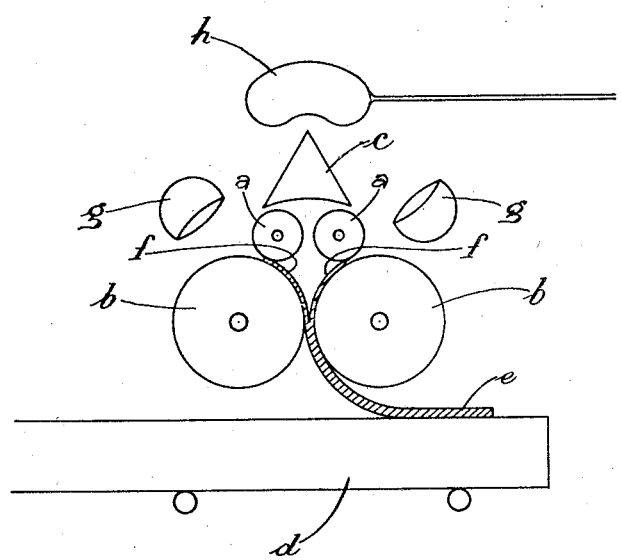
Inventor
Yvon Brancart
per [signature]
Attorney Patented Mar. 29, 1932

1,851,803

UNITED STATES PATENT OFFICE

YVON BRANCART, OF RONQUIERES, BELGIUM

PROCESS AND APPARATUS FOR ROLLING THICK PLATES OF GLASS

Application filed October 11, 1930, Serial No. 487,990, and in Belgium October 18, 1929.

This invention has reference to the production of plate glass and thick glass sheets by rolling. The usual process consisting of directly rolling the glass to the desired thickness is particularly suitable when the glass plate or sheet is not very thick but when a thick plate is to be obtained it is seen that the surface thereof shows more or less deep undulations which render a subsequent grinding or polishing treatment quite indispensable. These undulations are due to the difference in the contraction of the two sides of the plate, one of which i. e. that coming into contact with the receiving table cools down relatively quickly, while the other, which is exposed to the atmosphere, remains comparatively hot, the more so the greater the thickness of the plate.

The object of my present invention is to avoid as much as possible the production of such undulations and to obtain in a single operation plate glass of any desired thickness having a smooth surface on both sides. To this end I first roll separately two or more sheets of glass of less thickness than the plate to be produced, then I bring them together and unite them by rolling to form the final thick plate. The difference in the temperature, and consequently in the contraction, between both sides of a plate of glass thus formed of two or more layers, is greatly reduced on account of the fact that the component sheets, while still hot enough to unite with each other, have already undergone substantial cooling when they are so rolled together. In fact the undulations on the surface of such a composite plate are no more accentuated than those which would appear on the surface of one of the thin component sheets if these were rolled separately. I have found that when the process is carefully carried out, only a thin line across the edge of the finished plate shows the place where the component sheets have united, and this does not in any way impair the transparency of the glass.

In carrying out my improved process I may use any suitable type of double multiple glass rolling train, such as is used for the manufacture of armoured or wire glass for example, but I proceed in such manner that the separate amount of glass are only in contact with the rolls for a very short time before they are united into a single sheet or plate. I therefore use upper rolls of small diameter and larger lower rolls. I may separately and simultaneously feed the top pairs of rolls with glass from different sources, but I preferably feed them with glass from the same source which is conveniently a kidney shaped receptacle adapted to simultaneously feed two sheets side by side.

I have in the accompanying drawing diagrammatically illustrated one method of carrying out my invention.

In the said drawing I have shown two upper rolls of small diameter $a$ and two lower rolls $b$ of larger diameter which rolls $b$ are adapted to co-operate both with each other and with the upper rolls $a$. Above the rolls $a$ is a partition $c$. Under the lower rolls $b$ is a movable table $d$ for receiving the finished plate $e$ formed by the union of two sheets $f$ which are rolled first separately between the rolls $a$ and $b$, then together between the two large cylinders $b$. In order separately to form the two glass sheets $f$, glass is simultaneously poured from two ordinary receptacles $g$ into the spaces between the rolls $a$ and $b$ on each side of the apparatus, whereas if it is desired to form the two sheets from the same glass, a single kidney shaped receptacle is used, the cavity of which is placed astride the partition $c$ so that the glass is poured in two substantially equal streams forming each one of the sheets.

It however should be understood that my invention is not limited to the use of a rolling train as illustrated nor is it restricted to the uniting of two or any other given number of component sheets.

I claim:

1. In a process of forming thick glass plates free from undulations, simultaneously pouring masses of molten glass from a receptacle on both sides of a partition onto the upper surfaces of two co-operating rolls of large diameter, simultaneously rolling said masses of glass between said rolls and smaller rolls and immediately thereafter uniting the said separately rolled masses and simultaneously rolling them together between said rolls of large diameter.

2. In apparatus for rolling molten glass, the combination of a kidney-shaped receptacle, a substantially vertical partition extending axially under said receptacle, a pair of large rolls adapted to co-operate with one another, each of said rolls being adapted to receive glass supplied from said receptacle on one side of said partition, and two small rolls above said large rolls adapted each to co-operate with one of said large rolls.

YVON BRANCART.